United States Patent [19]

Lake, Jr. et al.

[11] Patent Number: 4,565,343

[45] Date of Patent: Jan. 21, 1986

[54] TERMINAL ELEVATING MECHANISM

[75] Inventors: Ralph J. Lake, Jr., Somerville; Nanjappa Bakthavachalam, Neshanic Station; Thomas A. Kachnowski, Flemington; Kevin S. Buist, New Brunswick, all of N.J.; David K. Walz, Stone Mountain, Ga.; Timothy R. Stern, Southfield, Mich.; Frank H. Stephens, Dunwoody, Ga.

[73] Assignee: Burroughs Corporation, Detroit, Mich.

[21] Appl. No.: 524,403

[22] Filed: Aug. 18, 1983

[51] Int. Cl.$^4$ .............................................. F16M 13/00
[52] U.S. Cl. ..................................... 248/346; 248/421
[58] Field of Search ............ 248/346, 421, 678, 188.2, 248/588; 358/249, 254

[56] References Cited

U.S. PATENT DOCUMENTS

| 2,832,497 | 4/1958 | Shroyer | 248/346 |
| 4,149,762 | 4/1979 | Olsson | 248/588 |

FOREIGN PATENT DOCUMENTS 34221 8/1981 European Pat. Off. .............. 254/98

*Primary Examiner*—Reinaldo P. Machado
*Assistant Examiner*—Alvin Chin-Shue
*Attorney, Agent, or Firm*—Robert A. Green; Kevin R. Peterson; Mark T. Starr

[57] ABSTRACT

A support mechanism for raising and lowering a terminal monitor comprising an upper assembly and a lower assembly and a plurality of pivotable arms interconnecting the upper assembly and lower assembly. The upper assembly includes an upper plate, which supports the monitor, and an upper slidable plate slidably coupled to it, and the lower assembly includes a base plate and a lower slidable plate slidably coupled to it. Due to the way the pivotable arms are coupled to the various plates, when the upper slidable plate is driven with respect to its associated upper plate, the arms pivot either to raise or lower the upper assembly and its monitor load with respect to the lower assembly.

8 Claims, 7 Drawing Figures

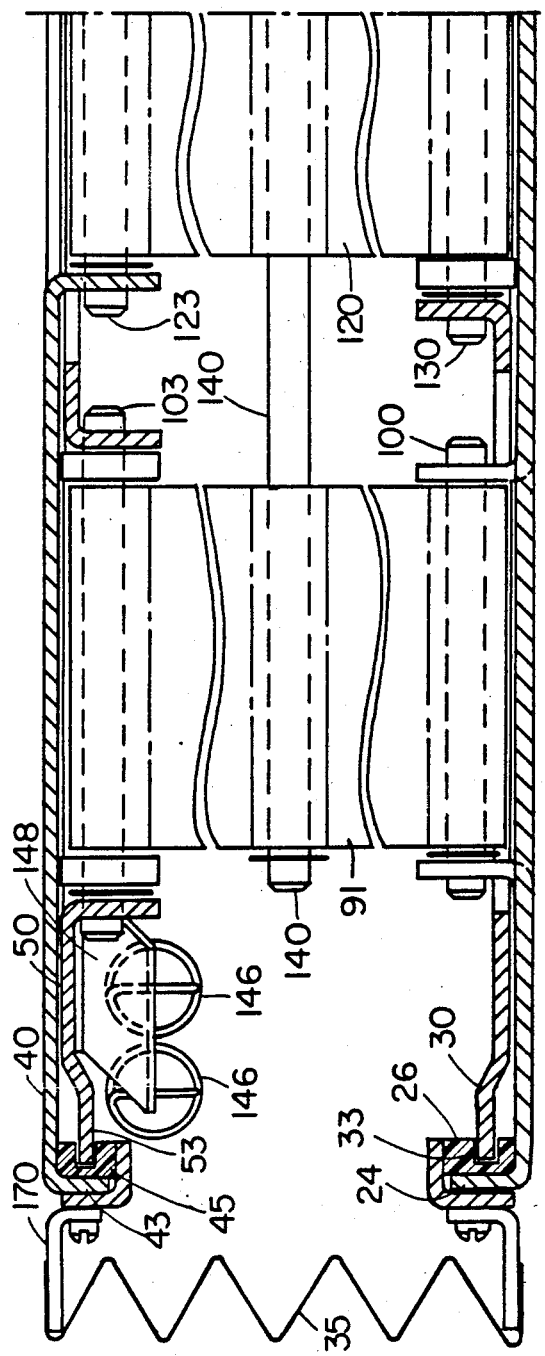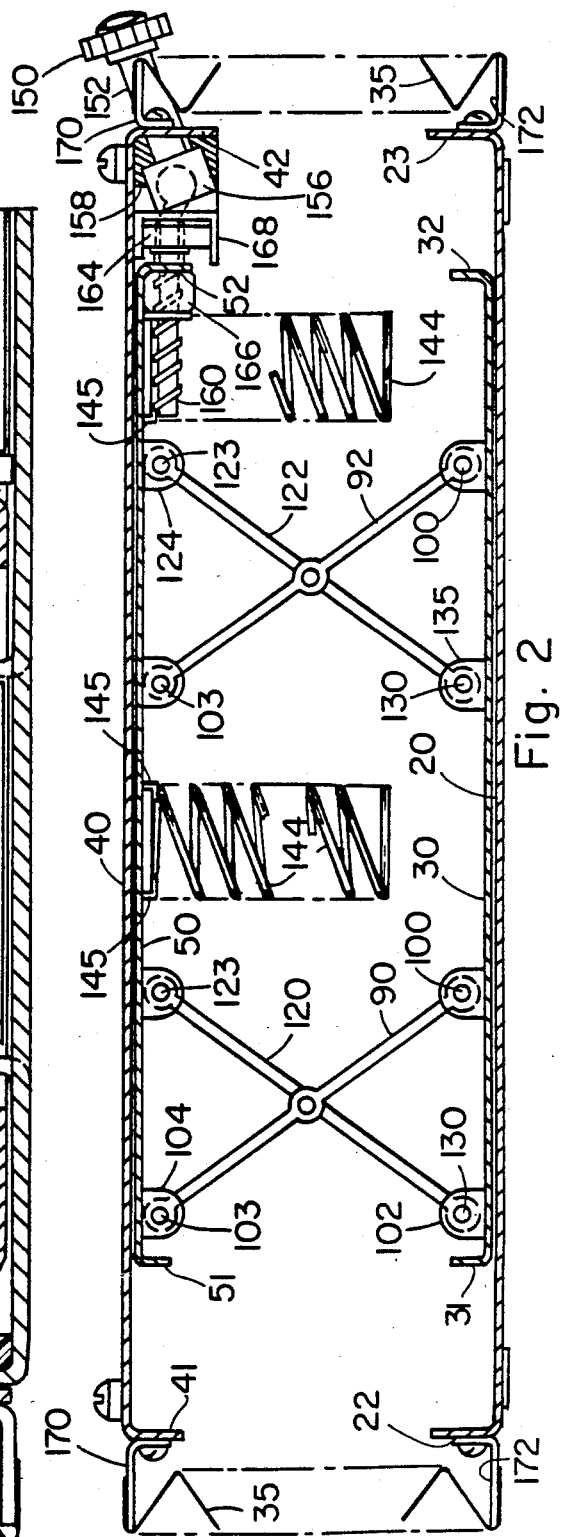

TERMINAL ELEVATING MECHANISM

BACKGROUND OF THE INVENTION

Electronic data processing terminals have come into wide use in recent years. In general, such terminals include a cabinet containing a cathode ray tube and a keyboard and other associated electronic apparatus.

Operator comfort has become an important consideration, and, toward this end, it has been considered desirable to be able to adjust the height of the cabinet containing the cathode ray tube.

The requirement is to be able to raise and lower a relatively heavy cabinet with ease, with minimum manipulation by the user, and, when lowered, the lifting mechanism should have minimum height. The present invention satisfies these requirements in a height adjustment mechanism for a terminal display cabinet.

DESCRIPTION OF THE DRAWINGS

FIG. 2 is a sectional view generally along the lines 2—2 in FIG. 1;

FIG. 3 is a sectional view generally along the lines 3—3 in FIG. 1;

DESCRIPTION OF THE INVENTION

Figure 1:
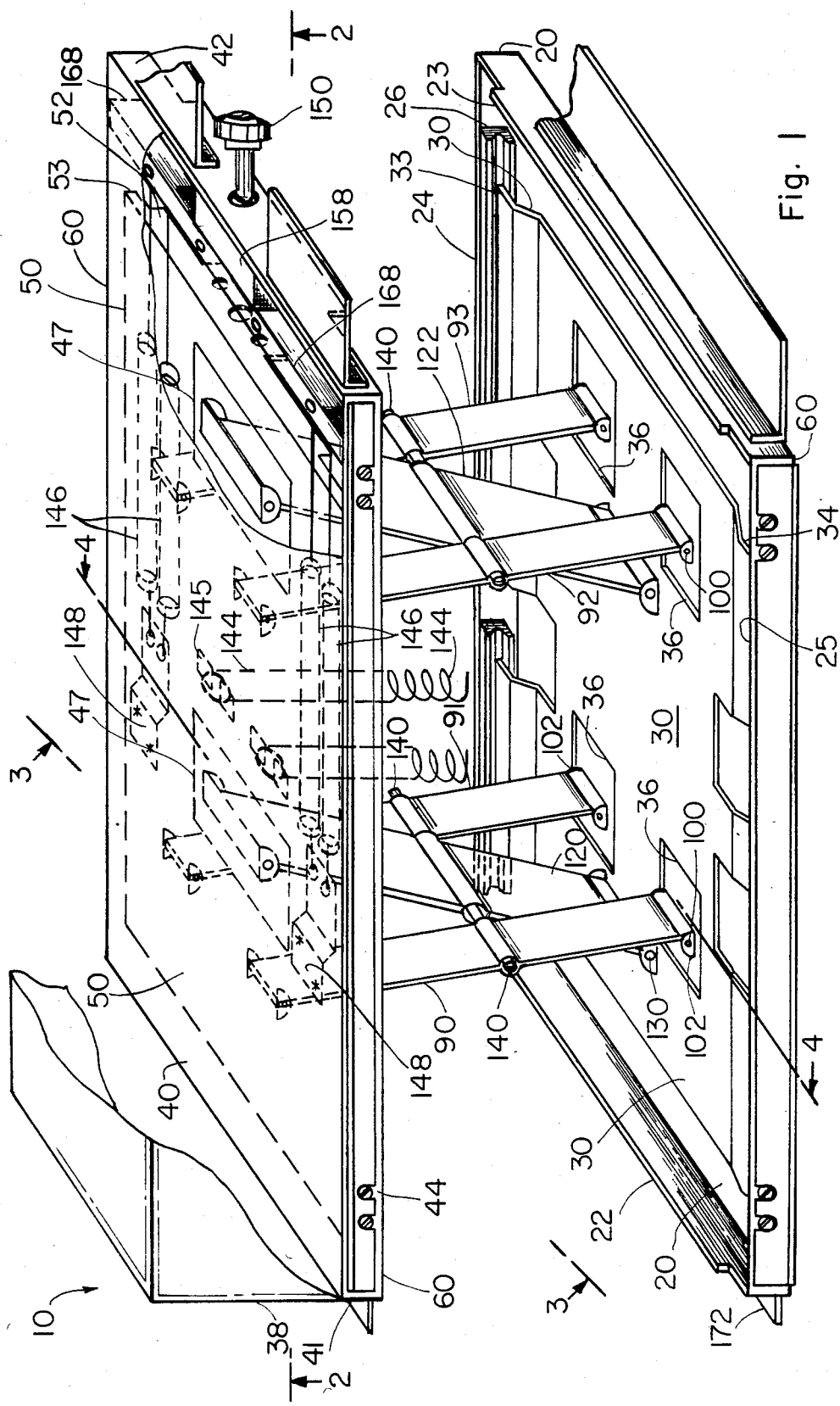
FIG. 1 is a perspective view of the invention.
Figure 7:
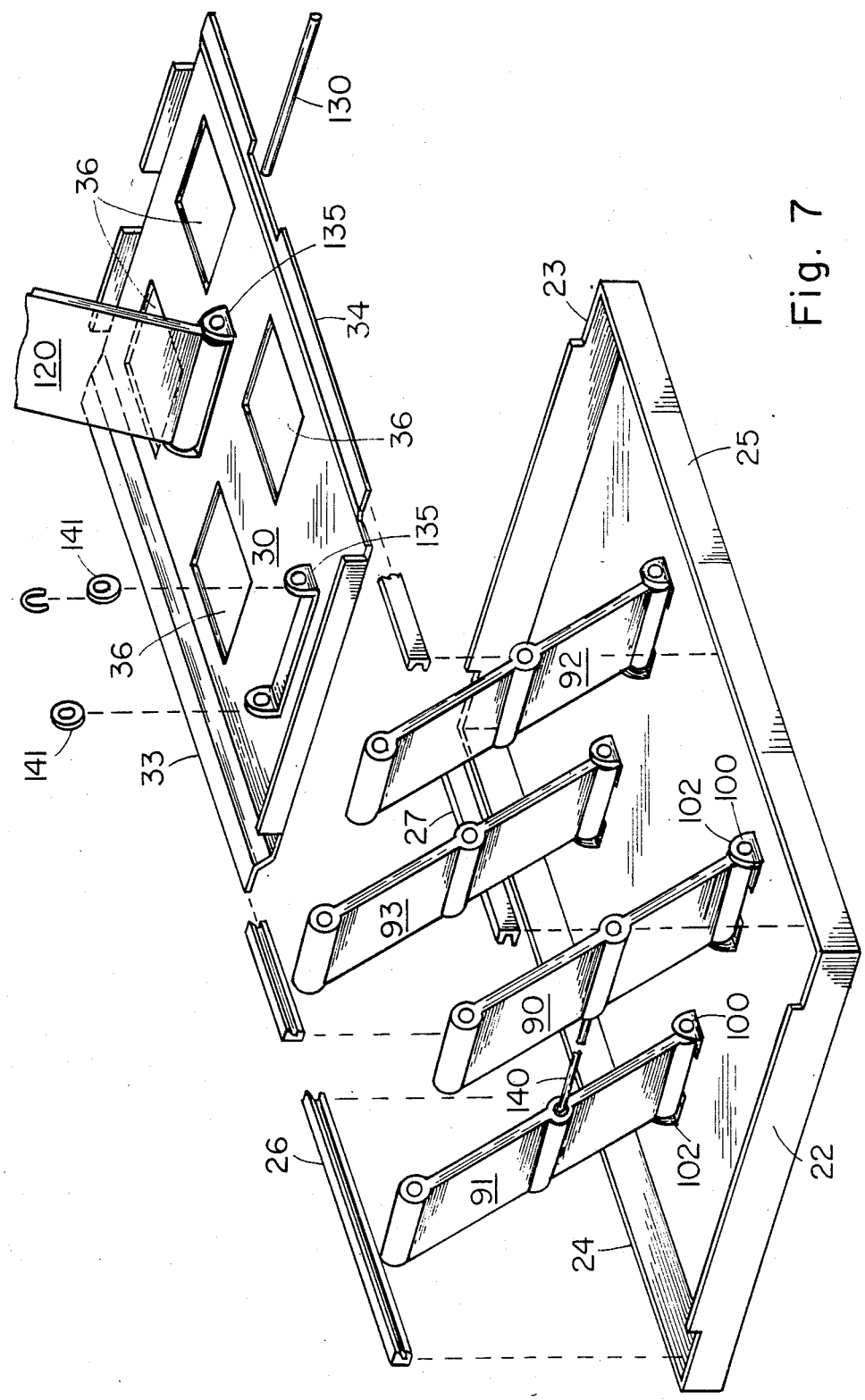
FIG. 7 is a perspective exploded view of the lower assembly of the invention.

The height adjustment mechanism of the invention 10 is made up of a lower assembly and an upper assembly which are interconnected by pivotable connecting arms. Referring first to the lower assembly, this portion of the apparatus 10 includes a base plate or lower tray 20 having left and right upstanding end walls 22 and 23 and rear and front upstanding walls 24 and 25. Slotted horizontal nylon card guide members 26 and 27, seen in FIGS. 1, 3, and 7, are secured along the inside surfaces of the rear and front walls 24, 25, respectively, so that the rear guide member 26 is aligned with and faces the front guide member 27.

A lower sliding plate 30 is mounted adjacent to and above the base plate 20. The sliding plate 30 has rear and front edges 33 and 34 which are supported in, and slide in, the rear and front guide members 26 and 27, respectively. The lower sliding plate 30 has four relatively large, spaced-apart cutout areas 36 for a purpose to be described.

Figure 4:
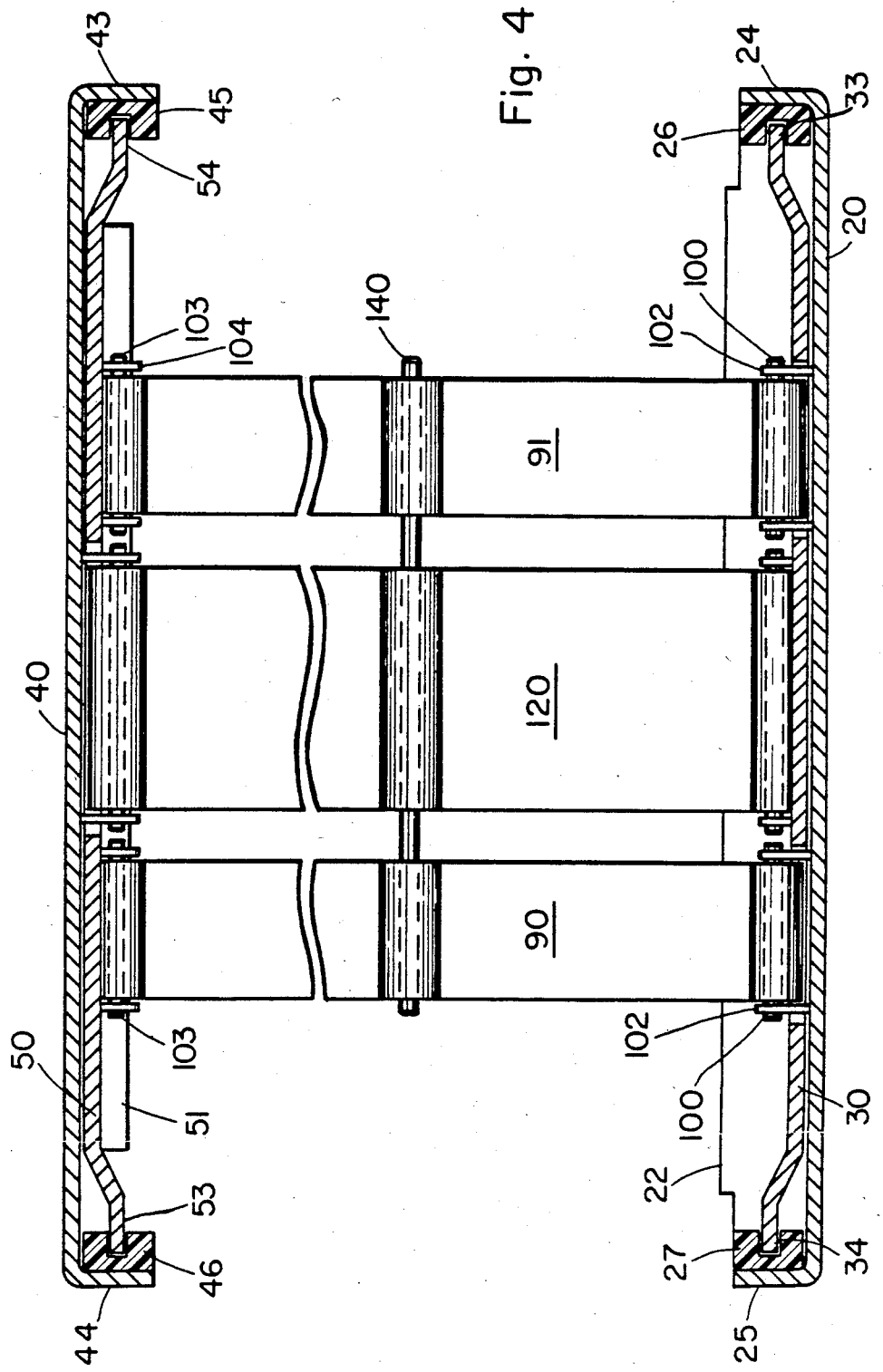
FIG. 4 is another sectional view similar to the view of FIG. 3.
Figure 5:
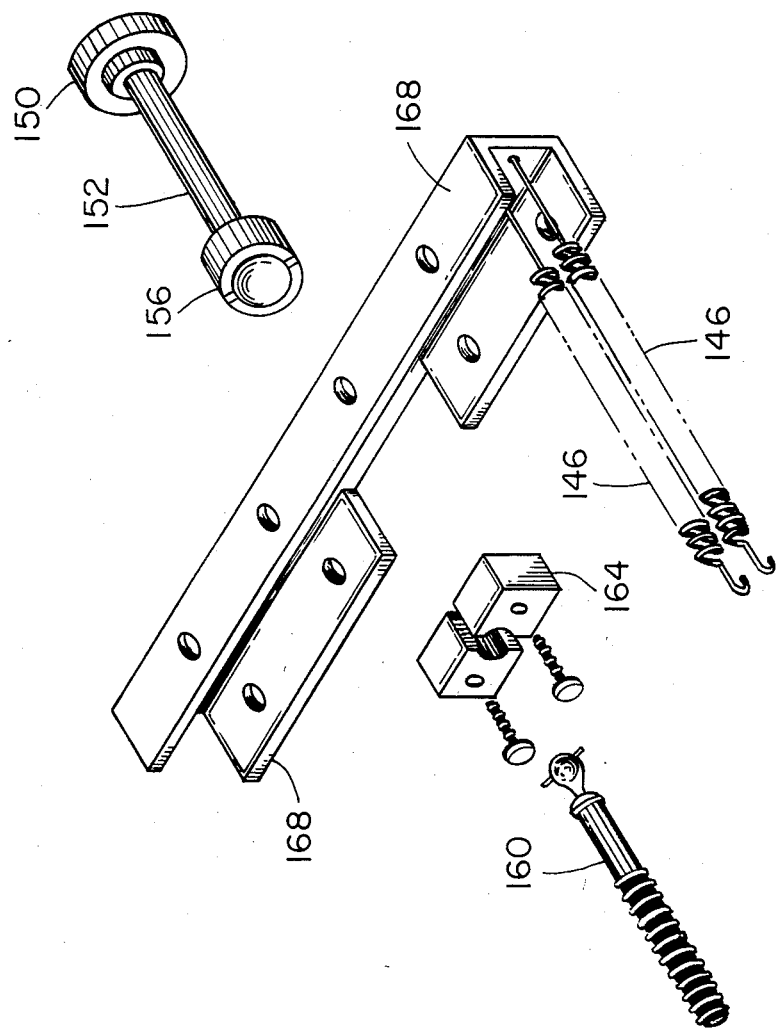
FIG. 5 is a perspective view of a portion of the upper assembly of the invention.

The upper assembly of apparatus 10 includes an upper plate 40, which supports a terminal monitor (FIG. 1), or the like, and an upper sliding plate 50 which are coupled to the lower plates 20 and 30 in a manner described below. The upper plate 40, generally in the form of a tray disposed upside down, has left and right depending end walls 41 and 42 and rear and front depending walls 43 and 44. Slotted nylon guide members 45 and 46 (FIGS. 3, 4, and 6) are secured along the inside surfaces of the rear and front walls 43 and 44 so that the rear guide member 45 faces the front guide member 46.

The upper sliding plate 50 is mounted adjacent to and just beneath the lower surface of the upper plate 40. The sliding plate 50 has left and right depending end walls 51 and 52 (FIG. 2) and rear and front edges 53 and 54 which are supported in, and slide in, the rear and front guide members 45, 46, respectively. The upper sliding plate has two relatively large cutout areas 47 disposed along its longitudinal axis for a purpose to be described.

Four identical lifter arms 90, 91, 92, 93, generally in the form of thin flat rectangular plates, have their lower ends pivotably coupled on pivot pins 100 seated in brackets 102 secured to the base plate. The arms 90, 91, 92, 93 slope generally upwardly to the left, along a negative slope, as seen in FIGS. 1 and 7. The upper ends (FIG. 2) are pivotably coupled to the upper sliding plate 50 on pivot pins 103 seated in brackets 104 secured to plate 50. The lower ends of arms 90–91 and arms 92–93 are aligned on parallel, vertical axes which are spaced from each other, and the upper ends of arms 90–91 and arms 92–93 are aligned on parallel, vertical axes which are spaced from each other.

Two other lifter arms 120 and 122 have one end pivotably secured to upper sliding plate 40 on pins 123 (FIGS. 2 and 6) seated in brackets 124. and they slant downwardly to the left, along a positive slope, where their lower ends are pivotably coupled by pins 130 to brackets 135 on lower slide plate 30. Arm 120 is located between the two arms 90 and 91 and is secured to plate 30 rearwardly of them. Arms 90, 91, and 120 form an operating unit. Arm 122 is secured to plate 30 between arms 92 and 93 and rearwardly of them, and these three arms form an operating unit. A pin 140 is inserted through the center of the three arms 90, 91, and 120, seen at the left in FIG. 1, and another pin 140 is inserted through the centers of the three arms 92, 93, and 122, seen at the right in FIG. 1.

In addition to having the nylon guides 45 and 46 reduce the friction of movement of the sliding plates, the movement of the lifter arms may be enhanced by providing bronze rollers 141 (FIG. 6) on the pivot pins at the upper and lower ends of the lifter arms.

It is noted that, as to arms 90, 91, 92, and 93, each extends through one of the apertures 36 in lower sliding plate 30, and, as to arms 120 and 122, each extends through one of the apertures 47 in upper sliding plate 50.

In the apparatus described, the tray 20 is the ground link for the lifter arms 90 and 92 which form a set of parallel links of a four-bar mechanism. The top sliding plate 50 is the coupler. The same applies to the lifter arms 91 and 93. Additional guidance control and improved stability are achieved by the four link mechanism made up of the top tray 40 as the ground link and arms 120 and 122 as the parallel links. The bottom slide plate 30 forms the coupler link.

A plurality of vertical helical compression springs 144 are provided between the upper and lower portions of the lifting apparatus 10 to assist in operation of the apparatus. The number and location of these springs depends on the application, and, in one embodiment of the invention, four such springs were provided, two spaced apart at about the center of the apparatus and two spaced apart near the front end of the apparatus. The upper ends of the springs are secured to the upper sliding plate by means of brackets 145 or in any suitable manner, and they extend part way to the bottom plate when the apparatus is elevated, generally as illustrated in FIG. 2.

Four horizontal extension springs 146 are also provided to assist the operation of the apparatus 10. The springs are disposed in pairs and are secured, at one end, to the channel 168 which is fixed to the top plate 40 and, at the other end, to brackets 148.

Figure 6:
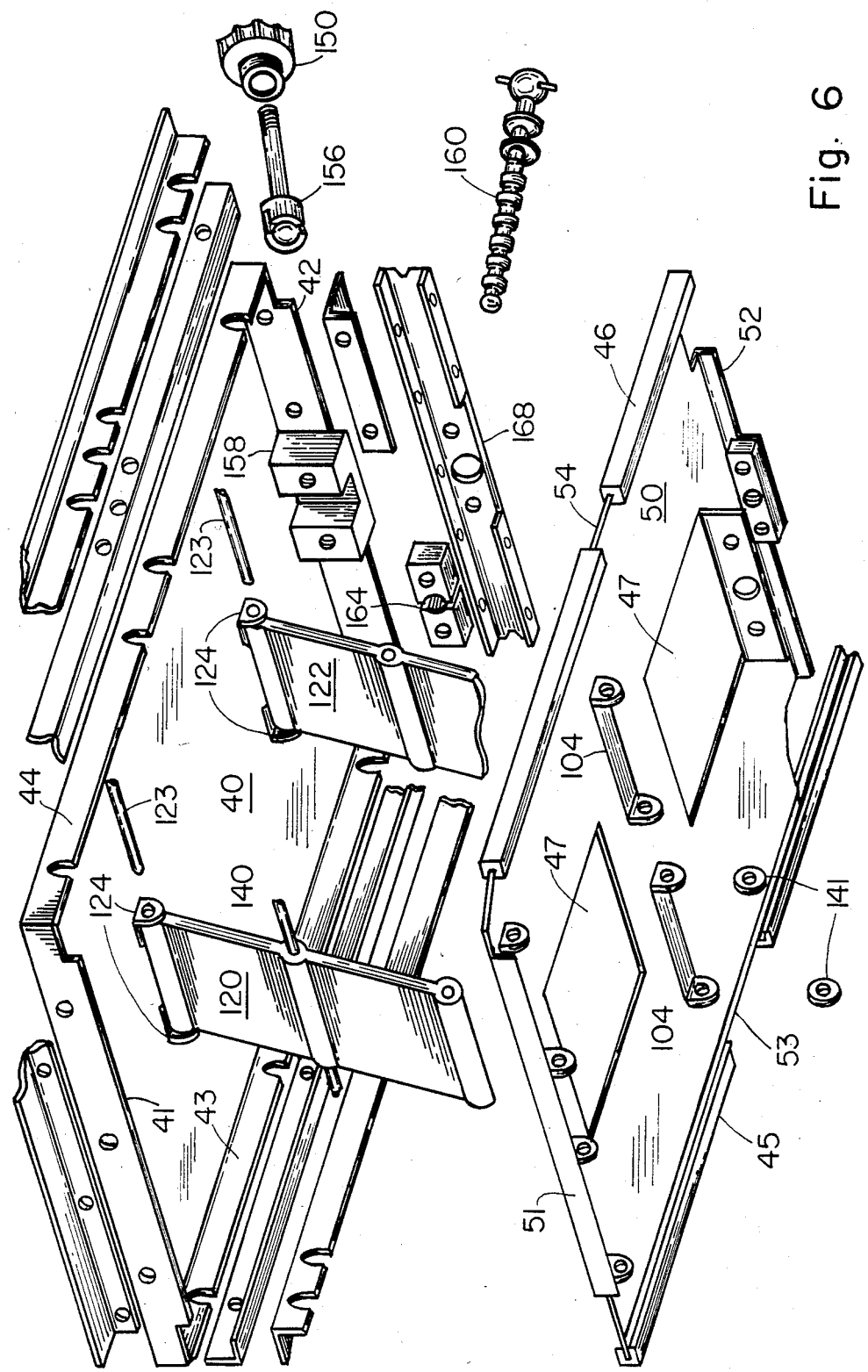
FIG. 6 is a perspective exploded view of the upper assembly of the invention.

The drive mechanism for the apparatus 10, which is self-locking, includes a knob 150 having a shaft 152 which extends through a hole in depending wall 42 of upper tray 40 (FIGS. 1, 2, and 6). The inner end 156 of the knob shaft 152 is seated on a bearing retainer 158. The bearing retainer 158, the channel 168, and the bearing block 164 are all secured to the depending wall 42. The inner end 156 of the knob shaft is coupled to and is adapted to rotate a lead screw 160 which extends through a thrust bearing block 164 and a nut 166. The nut 166 is fixed to the lower surface of the top sliding plate 50 at end wall 52. The channel 168 is secured to the top plate 40. The channel 168 houses the thrust bearing block 164.

In operation of apparatus 10, as the lead screw 160 is turned by the knob 150, its axial motion is prevented by the thrust bearing block 164, but it moves the nut 166 and thus the top slide plate 50. The nylon guides 45 and 46 reduce the friction of the movement of the parts, and, if desired, bronze rollers may be provided at the upper and lower ends of the lifter arms to further reduce friction. When the top slide plate 50 moves, it drives and pivots the lifter arms 90, 91, 92, and 93 at their lower ends since they are connected to the top slide plate, and these interact with arms 120 and 122 to cause the bottom slide plate to move with respect to the bottom tray 20, and either it goes up or down and either raises or lowers the terminal 38 carried on the top tray 40. The four lifter arms 90, 91, 92, and 93 are partially held in position by the extension springs 146, and the unbalanced load is distributed in the lead screw nut assembly and in the thrust bearing 164.

When the apparatus 10 is at its lowest position, the effort required to raise the CRT terminal 38 placed on top of the tray 40 is high. In order to overcome the weight, the four compression springs 144 are used. These compression springs are inactive when the mechanism is in the upper range of its motion.

The complete mechanism described above is hidden inside a bellows 35 (FIGS. 2 and 3) which contracts and expands, depending upon whether the motion is downward or upward. The top edges of the bellows are attached to plate 170 secured to the edges of the bottom tray 20.

The apparatus 10 has many advantages and favorable features. For one thing, in its lowered state, the apparatus measures only about one inch in height. When elevated, the apparatus has great stability, even with the weight of the terminal, and, in addition, a relatively heavy terminal can be raised easily by manipulation of a small knob which is self locking. The various operations are assisted by the springs which are provided "L-shaped brackets (28, 29) are secured to the front and rear edges of the upper and base plates to form a channel for securing the guide members".

What is claimed is:

1. An elevating support mechanism comprising
    a base plate,
    a lower slidable plate adjacent to said base plate and slidable with respect to said base plate,
    an upper plate for supporting apparatus to be raised and lowered by an operator,
    an upper slidable plate adjacent to said upper plate and slidable with respect to said upper plate,
    a plurality of first lifter arms in the form of flat plates, each pivotably secured at one end to said base plate and pivotably secured at the other end to said upper slidable plate, said first lifter arms all sloping in the same direction with a negative slope from said base plate to said upper slidable plate,
    a plurality of second lifter arms in the form of flat plates, each pivotably secured at one end to said upper plate and pivotably secured at the other end to said lower slidable plate, each of said second lifter arms sloping in the same direction with a positive slope, and
    means for moving said upper slidable plate to cause said arms to pivot and move said lower slidable plate and thereby to raise or lower said upper plate and its supported apparatus with respect to said base plate.

2. The apparatus defined in claim 1 and including brackets secured to the edges of said upper plate and base plate and a bellows engaging said brackets and extending between said upper plate and said base plate to cover the space between said upper plate and said base plate.

3. The apparatus defined in claim 1 and including a plurality of compression springs secured to said upper slidable plate and extending downwardly therefrom to engage said lower slidable plate when the upper plate is in a lowered position and it is desired to raise the upper plate, said springs assisting the raising of said upper plate.

4. The apparatus defined in claim 1 and including a plurality of horizontal springs extending between said upper sliding plate and one end of said upper plate to assist the movement of said upper sliding plate with respect to said upper plate.

5. The apparatus defined in claim 1 wherein said base plate includes front and rear walls and first guide tracks secured to the inner surface of each of said walls, the lower slidable plate having front and rear edges which rest in and are guided in said guide tracks, and said upper plate has front and rear walls and second guide tracks secured to the inner surfaces thereof, and said upper slidable plate has front and rear edges which rest in and are guided in said second guide tracks.

6. An elevating support mechanism comprising
    a rectangular base plate having left and right edges and front and rear edges,
    an upstanding wall at each of said edges,
    a first L-shaped bracket secured to each of said front and rear edges and extending inwardly to form a channel with the associated upstanding wall,
    a first slotted guide member secured in each of said channels disposed along said front and rear edges of said base plate,
    a second L-shaped bracket secured to all of said edges of said base plate and extending outwardly therefrom,
    a lower rectangular slidable plate adjacent to and above said base plate and slidable with respect to said base plate,
    said lower slidable plate having four rectangular apertures,
    a rectangular upper plate having left and right edges and front and rear edges and adapted to support apparatus to be used by an operator, a depending wall at each of said edges of said upper plate, a first L-shaped bracket secured to the depending wall at each of said front and rear edges of said upper plate and extending inwardly to form a channel therewith, a second slotted guide member secured in each of said channels disposed along said front and rear edges of said upper plate, second L-shaped brackets secured to said edges of said upper plate and extending outwardly therefrom, a bellows enclosing said mechanism and held in place on said L-shaped brackets, an upper rectangular slidable plate adjustable to and beneath said upper plate and slidable with respect to said upper plate, said upper slidable plate having two rectangular apertures, four first lifter arms in the form of flat plates, each pivotably secured to one end to said base plate and pivotably secured at the other end to said upper slidable plate, said first lifter arms all sloping in the same direction with a negative slope from said base plate to said upper slidable plate, two second lifter arms in the form of flat plates, each pivotably secured at one end to said upper plate and pivotably secured at the other end to said lower slidable plate, each of said second lifter arms sloping in the same direction with a positive slope, each of said first and second lifter arms having a central axis about which the arm pivots, each of said second lifter arms being aligned with two of said first lifter arms as an operating unit, with the central axes of all of the lifter arms in a unit being aligned and with a pivot pin seated in the ailgned central axes of the lifter arms of each unit, and means for moving said upper slidable plate to cause said lifter arms to pivot about their central axes and thus raise or lower said upper plate and the apparatus supported thereby with respect to said base plate.

7. An elevating support mechanism comprising an upper assembly and a lower assembly a plurality of pivotable arms in the form of flat plates interconnecting said upper assembly and said lower assembly, said upper assembly including a first plate and a second plate slidably coupled thereto, said lower assembly including a first plate and a second plate slidably coupled thereto, four of said arms pivotably coupled at their upper ends to said second plate of said upper assembly and pivotably coupled at their lower ends, to the first plate of said lower assembly, two of said arms pivotably coupled at their upper ends to the first plate of said upper assembly and pivotably coupled at their lower ends to said second plate of said lower assembly, drive means coupled to said second plate of said upper assembly and operating to slide said second plate of said upper assembly with respect to the first plate of said upper assembly whereby said arms are caused to pivot and to raise or lower the upper assembly with respect to the lower assembly.

8. An elevating support mechanism comprising a base plate, a lower slidable plate adjacent to said base plate and slidable with respect to said base plate, an upper plate for supporting apparatus to be raised and lowered by an operator, an upper slidable plate adjacent to said upper plate and slidable with respect to said upper plate, first and second lifter arms aligned with each other and each pivotably secured at its lower end to said base plate and pivotably secured at its upper end to said upper slidable plate, said first and second lifter arms sloping in the same direction with a negative slope from said base plate to said upper slidable plate, a third lifter arm being positioned between said first and second lifter arms and oriented with a positive slope, a common pivot pin inserted through the centers of said first, second, and third arms to serve as a pivot axis therefor, fourth and fifth lifter arms aligned with each other and each pivotably secured at its upper end to said upper slidable plate and pivotably secured at its lower end to said base plate, each of said fourth and fifth lifter arms sloping in the same direction with a negative slope, said fourth and fifth lifter arms being spaced from said first and second lifter arms, aسixth lifter arm positioned between said fourth and fifth lifter arms and oriented with a positive slope, a common pivot pin inserted through the centers of said fourth, fifth, and sixth arms to serve as a pivot axis therefor, and means coupled to said upper slidable plate for moving said upper slidable plate with respect to said upper plate to cause all of said arms to pivot and move said lower slidable plate with respect to said base plate and thereby to raise or lower said upper plate and its supported apparatus with respect to said base plate.

* * * * *

UNITED STATES PATENT AND TRADEMARK OFFICE
CERTIFICATE OF CORRECTION

PATENT NO. : 4,565,343
DATED : January 21, 1986
INVENTOR(S) : Ralph J. Lake, Jr., et al.

It is certified that error appears in the above-identified patent and that said Letters Patent is hereby corrected as shown below:

Col. 1, line 56, after "monitor" insert --38--.

Col. 3, line 5, after "148." insert --The springs 146 are disposed generally parallel to the front and rear ends of the apparatus or walls 44 and 43 of the tray-like upper plate--.

Col. 3, line 49, after "of the" insert --top tray 40, and the bottom edges of the bellows are attached to plates 172 secured to the edges of the--.

Col. 3, line 58, after "provided" insert --.--.

Col. 3, line 65, change "adJacent" to --adjacent--.

Col. 5, line 37, change "ailgned" to --aligned--.

Signed and Sealed this

Twenty-second Day of April 1986

[SEAL]

Attest:

DONALD J. QUIGG

Attesting Officer

Commissioner of Patents and Trademarks